US011155365B2

(12) United States Patent
Soejima

(10) Patent No.: US 11,155,365 B2
(45) Date of Patent: Oct. 26, 2021

(54) AIRCRAFT MANAGEMENT SYSTEM

(71) Applicant: SUBARU CORPORATION, Tokyo (JP)

(72) Inventor: Hideki Soejima, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/373,937

(22) Filed: Apr. 3, 2019

(65) Prior Publication Data

US 2019/0308751 A1 Oct. 10, 2019

(30) Foreign Application Priority Data

Apr. 9, 2018 (JP) .............................. JP2018-074548

(51) Int. Cl.
B64F 5/60 (2017.01)
G07C 5/00 (2006.01)
B64F 5/40 (2017.01)
B64D 45/00 (2006.01)

(52) U.S. Cl.
CPC .................. B64F 5/60 (2017.01); B64F 5/40 (2017.01); G07C 5/006 (2013.01); G07C 5/008 (2013.01); B64D 2045/0085 (2013.01)

(58) Field of Classification Search
CPC ... B64F 5/60; B64F 5/40; G07C 5/006; G07C 5/008; B64D 2045/0085
See application file for complete search history.

(56) References Cited

U.S. PATENT DOCUMENTS

| 6,115,656 | A | 9/2000 | Sudolsky |
| 8,843,348 | B2 | 9/2014 | Pascu et al. |
| 9,002,722 | B2 | 4/2015 | Helms et al. |
| 2005/0171661 | A1 | 8/2005 | Abdel-Malek et al. |
| 2007/0113657 | A1* | 5/2007 | Hammond ............. G01M 7/02 73/663 |
| 2010/0131238 | A1* | 5/2010 | Boldrin ................. G05B 23/02 702/182 |

(Continued)

FOREIGN PATENT DOCUMENTS

| CN | 107869960 A | 4/2018 |
| CN | 109050970 A | 12/2018 |

(Continued)

OTHER PUBLICATIONS

Machine Translation of JP2013014151A (Year: 2013).*

(Continued)

Primary Examiner — Anne Marie Antonucci
Assistant Examiner — Sahar Motazedi
(74) Attorney, Agent, or Firm — Smith, Gambrell & Russell, LLP

(57) ABSTRACT

An aircraft management system includes a sensor, a diagnosis executor, and an outputter. The sensor is loaded onto an aircraft. The diagnosis executor diagnoses health of a part of the aircraft on the basis of output from the sensor while the aircraft is flying. The outputter outputs predetermined recommendation information to an outside of the aircraft through wireless communication, in the case where the part satisfies a preset maintenance recommendation condition as a result of the diagnosis of the health.

19 Claims, 6 Drawing Sheets

(56) References Cited

U.S. PATENT DOCUMENTS

| | | | |
|---|---|---|---|
| 2011/0035088 A1* | 2/2011 | White | B64F 5/60 701/31.4 |
| 2011/0170823 A1 | 7/2011 | Xia et al. | |
| 2012/0323531 A1 | 12/2012 | Pascu et al. | |
| 2013/0073419 A1 | 3/2013 | Marwedel et al. | |
| 2013/0133422 A1* | 5/2013 | Yamanaka | G01P 15/125 73/504.03 |
| 2014/0060188 A1* | 3/2014 | Singh | G01N 29/4436 73/579 |
| 2014/0121885 A1* | 5/2014 | Schoonveld | G06Q 10/10 701/29.3 |
| 2015/0134194 A1 | 5/2015 | Beaujard et al. | |
| 2016/0018294 A1* | 1/2016 | Moriya | B60G 17/0185 73/11.07 |
| 2016/0259873 A1 | 9/2016 | Kessie et al. | |
| 2017/0134087 A1 | 5/2017 | Law et al. | |
| 2017/0166328 A1 | 6/2017 | Ethington et al. | |
| 2017/0369190 A1 | 12/2017 | Ethington et al. | |
| 2018/0266584 A1 | 9/2018 | Sundareswara et al. | |
| 2018/0285437 A1* | 10/2018 | Boggio | G06F 16/2465 |
| 2018/0349532 A1 | 12/2018 | Kessie et al. | |
| 2019/0304212 A1* | 10/2019 | Bailey | G07C 5/0825 |
| 2020/0005250 A1 | 1/2020 | Soejima | |

FOREIGN PATENT DOCUMENTS

| | | |
|---|---|---|
| EP | 0 407 179 A1 | 1/1991 |
| EP | 3 065 092 A1 | 9/2016 |
| GB | 2 423 342 A | 8/2006 |
| JP | 2009-274588 A | 2/2005 |
| JP | 2003-002298 A | 1/2008 |
| JP | 2011253393 A * | 12/2011 |
| JP | 2013-14151 A | 1/2013 |
| JP | 2016-173358 A | 9/2016 |
| JP | 2017049940 A * | 3/2017 |
| WO | 2015/198213 A1 | 12/2015 |

OTHER PUBLICATIONS

Machine Translation of JP2011253393 (Year: 2011).*
Machine Translation of JP2017049940 (Year: 2017).*
Office Action for Japanese Patent Application No. 2018-074548 dated Mar. 3, 2020 (3 pages with machine translation).
Extended European Search Report dated Sep. 10, 2019 for European Patent Application No. 19166516.5 (6 pages in Japanese with English Translation).
Office Action received in U.S. Appl. No. 16/411,339 dated Jan. 6, 2021 (17 pages).
Final Office Action received in U.S. Appl. No. 16/411,339 dated Jun. 16, 2021 (25 pages).

* cited by examiner

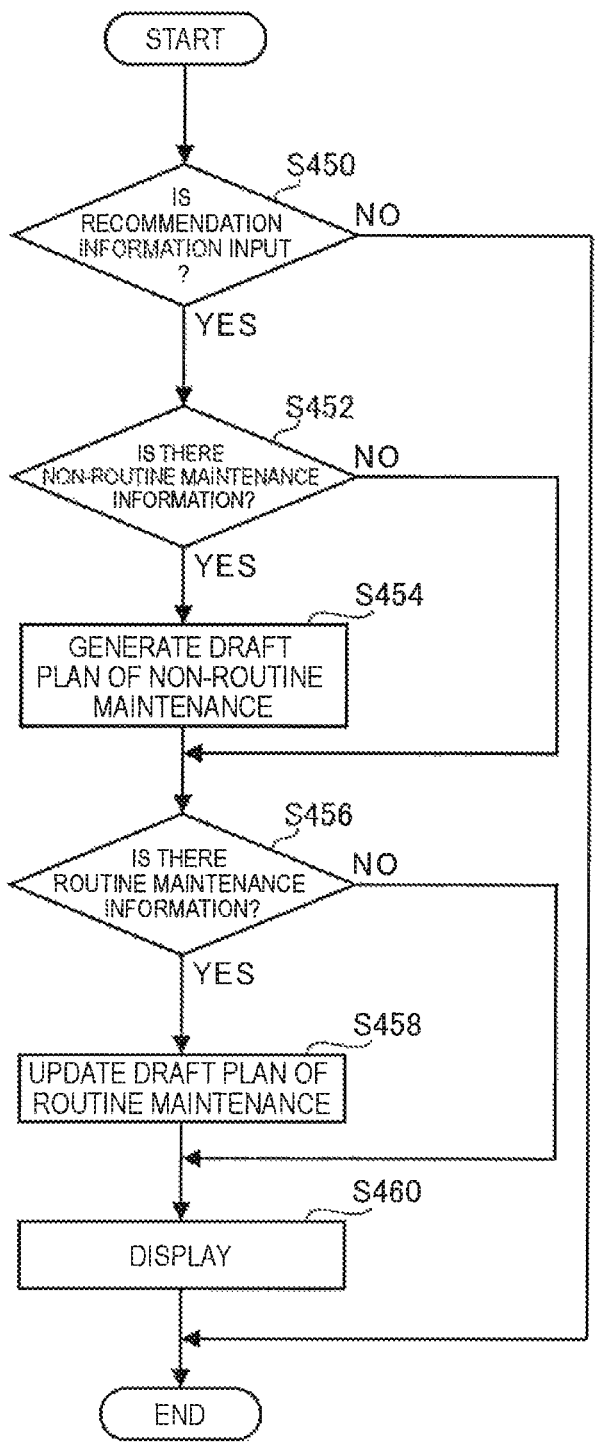

AIRCRAFT MANAGEMENT SYSTEM

CROSS-REFERENCE TO RELATED APPLICATIONS

The present application claims priority from Japanese Patent Application No. 2018-074548 filed on Apr. 9, 2018, the entire contents of which are hereby incorporated by reference.

BACKGROUND

The disclosure relates to an aircraft system.

An aircraft is inspected and maintained while being at an airport. Maintenance of the aircraft includes routine maintenance and non-routine maintenance. The routine maintenance is periodical maintenance that has been set in advance. In the routine maintenance, a maintenance item is decided in accordance with an upper limit of a maintenance interval that is set for each part included in the aircraft. In the non-routine maintenance, a cause of sudden malfunction is investigated and the cause is handled.

For instance, Japanese Unexamined Patent Application Publication (JP-A) No. 2013-14151 discloses a technology of accumulating measurement data in a data logger loaded onto an aircraft, the measurement data being obtained by various kinds of sensors while the aircraft is flying. After the aircraft lands, a server reads the measurement data accumulated in the data logger, and a maintenance item of routine maintenance is added in accordance with an analysis result of the measurement data.

SUMMARY

An aspect of the disclosure provides an aircraft management system including a sensor configured to be loaded onto an aircraft, a diagnosis executor configured to diagnose health of a part of the aircraft on the basis of output from the sensor while the aircraft is flying, and an outputter configured to output predetermined recommendation information to an outside of the aircraft through wireless communication, in the case where the part satisfies a preset maintenance recommendation condition as a result of the diagnosis of the health.

An aspect of the disclosure an aircraft management system including a sensor configured to be loaded onto an aircraft; and circuitry configured to diagnose health of a part of the aircraft on a basis of output from the sensor while the aircraft is flying and output a predetermined recommendation information to an outside of the aircraft through wireless communication, in a case where the part satisfies a preset maintenance recommendation condition as a result of diagnosis of the health.

BRIEF DESCRIPTION OF THE DRAWINGS

The accompanying drawings are included to provide a further understanding of the disclosure and are incorporated in and constitute a part of this specification. The drawings illustrate example implementations and, together with the specification, serve to explain the principles of the disclosure.

FIG. 6 is a flowchart illustrating procedure of a process of the maintenance management server.

DETAILED DESCRIPTION

Figure 1:
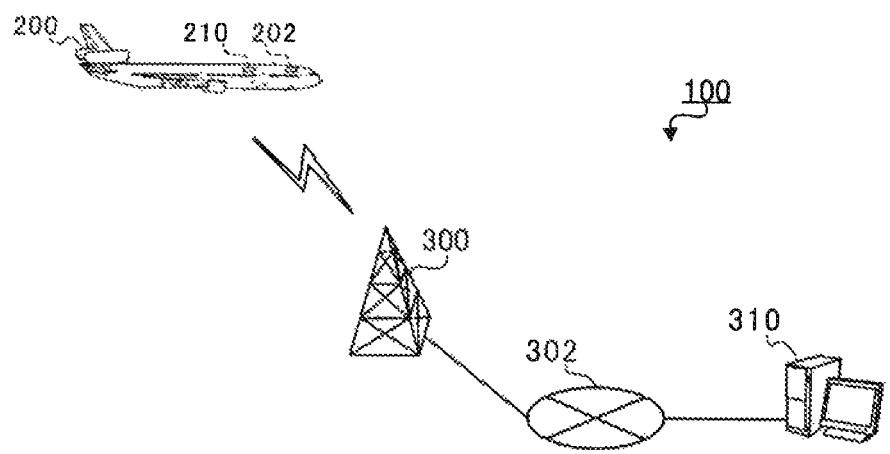
FIG. 1 is a diagram illustrating an aircraft management system.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. As described in JP-A No. 2013-14151 referred to above, when a maintenance item of routine maintenance is added in accordance with an analysis result of measurement data, it is possible to give a reaction such as part replacement before malfunction occurs. Therefore, it is possible to suppress frequency of non-routine maintenance. However, since the maintenance item is added at the last minute, it is difficult to predict time it takes to perform routine maintenance until just before it happens.

It is desirable to provide the aircraft management system that makes it possible to suppress frequency of non-routine maintenance and early predict time it takes to perform routine maintenance.

FIG. 1 is a diagram illustrating an aircraft management system 100. As illustrated in FIG. 1, the aircraft management system 100 includes a diagnosis device 210 and a maintenance management server 310. The diagnosis device 210 is prepared for each of the aircrafts 200, and loaded onto each of the aircrafts 200. The maintenance management server 310 is prepared for each airport, for instance.

The diagnosis device 210 communicates with the maintenance management server 310 via a wireless communication device 202 loaded onto the aircraft 200, a base station 300, and a communication network 302 (Such as a LAN or the Internet). Hereinafter, the diagnosis device 210 will be described first, and then the maintenance management server 310 will be described next.

Figure 2:
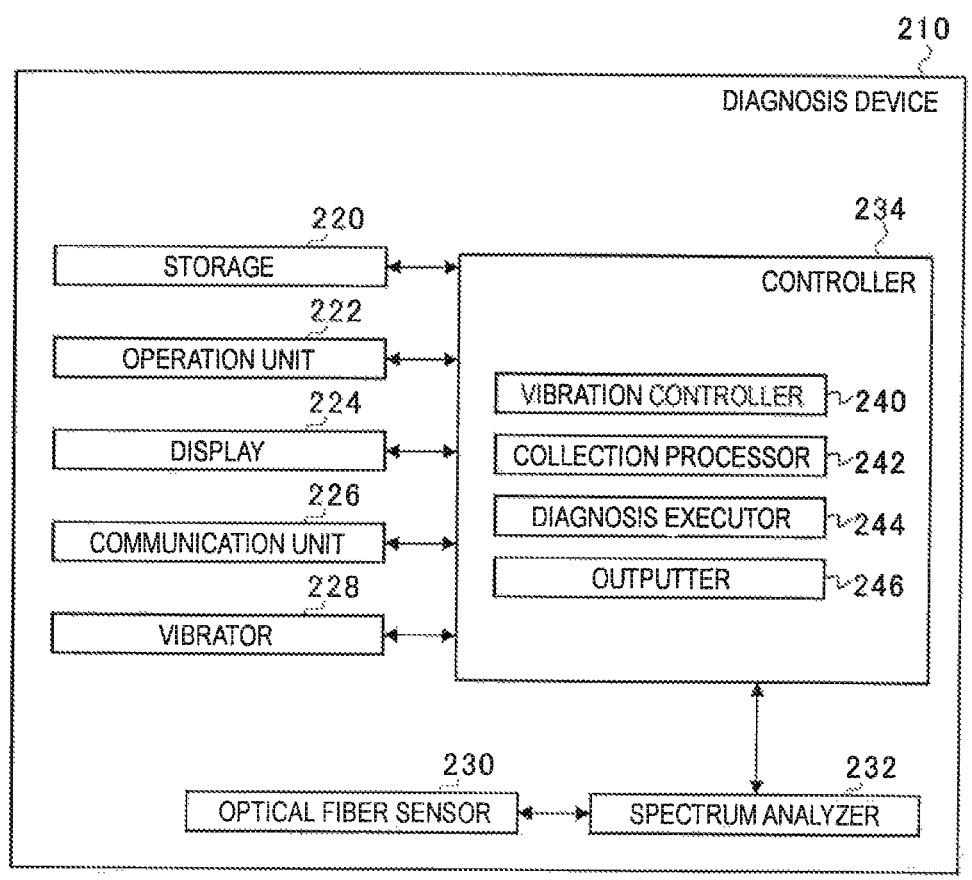
FIG. 2 is a block diagram illustrating a configuration of a diagnosis device.

FIG. 2 is a block diagram illustrating a configuration of the diagnosis device 210. As illustrated in FIG. 2, the diagnosis device 210 includes a storage 220, an operation unit 222, a display 224, a communication unit 226, a vibrator 228, an optical fiber sensor 230 (sensor), a spectrum analyzer 232, and a controller 234.

The storage 220 is implemented as RAM, flash memory, an HDD, or the like. For instance, the operation unit 222 is implemented as a keyboard or a touchscreen that is superimposed on the display 224. The operation unit 222 receives operation input from a user. The display 224 is implemented as a liquid crystal display, an organic electro-luminescence (EL) display, or the like.

The communication unit 226 communicates with the wireless communication device 202 loaded onto the aircraft 200 in a wired manner, for instance. The vibrator 228 is implemented as piezoelectric elements (piezo elements) attached to a sheet.

Figure 3A:
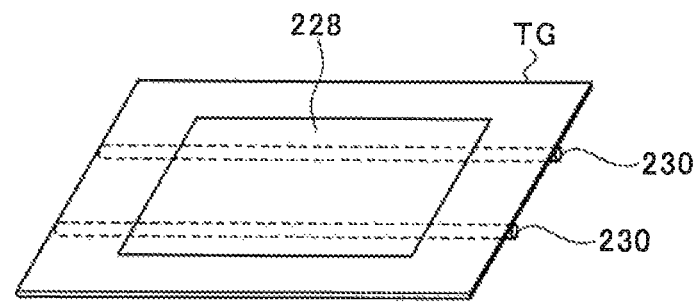
FIG. 3 is an explanatory diagram of a vibrator and optical fiber sensors.
Figure 3B:
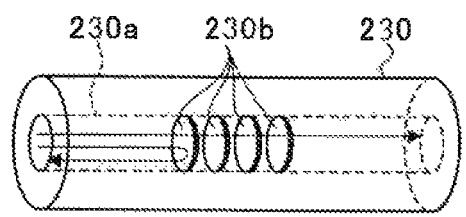

FIG. 3 is an explanatory diagram illustrating the vibrator 228 and the optical fiber sensors 230. FIG. 3A illustrates a target TG to which the vibrator 228 and the optical fiber sensors 230 are attached. FIG. 3B illustrates an internal configuration of the optical fiber sensor 230.

For instance, the target TG is a part included in the aircraft 200. The number of the targets TG is two or more, and the vibrator 228 and the optical fiber sensors 230 are prepared for each of the targets TG. Here, a case where the targets TG are plate-like members is taken as an instance. However, the shapes of the targets TG are not limited thereto. The vibrator 228 and the optical fiber sensors 230 are attached to (installed on) the target TG in an appropriate manner based on the shape of the target TG.

The piezoelectric elements of the vibrator 228 are coupled to conducting wire (not illustrated). When voltage is applied to a piezoelectric element via the conducting wire, the thickness of the piezoelectric element changes due to the piezoelectric effect. When pulse voltage is applied to any piezoelectric element among the piezoelectric elements, the vicinity of the piezoelectric element to which the voltage is applied gets vibrated in the target TG. In such a way, the vibrator 228 vibrates the target TG.

For instance, the optical fiber sensor 230 is intrinsic. In other words, in the optical fiber sensor 230, the optical fiber itself functions as a sensor element. However, the optical fiber sensor 230 may be an extrinsic optical fiber sensor that causes the optical fiber to function only as an optical transmission line to/from another sensor element. For instance, the optical fiber sensor 230 is bonded to the target TG with adhesive.

As illustrated in FIG. 3B, a core 230a is installed in the inside of a coating or cladding of the optical fiber sensor 230. Light passes through the core 230a. Light transmitting through the core 230a toward an outside is reflected by the cladding and returned to the core 230a.

Grating members 230b are installed in the core 230a. The grating members 230b have different refractive indices from the other parts of the core 230a. The grating members 230b are installed apart from each other in the axis direction of the optical fiber. The grating members 230b cause the refractive indices to change periodically (fiber Bragg grating (FBG)).

In the grating members 230b, broadband spectrum light interferes with a specific wavelength called Bragg wavelength in a direction in which they strengthen each other. In such a way, the grating members 230b reflects only a specific wavelength component in the broadband spectrum light. Light of the other wavelength passes through the grating members 230b.

The wavelength of reflected light is changed when disturbance is added to the grating members 230b. The disturbance added to the grating members 203b is measured by measuring the change in the wavelength of the reflected light.

The spectrum analyzer 232 illustrated in FIG. 2 is coupled to the optical fiber sensors 230. The spectrum analyzer 232 includes a light source and a light receiver. The light source emits broad spectrum light, and the broad spectrum light reaches the optical fiber sensors 230. As described above, the optical fiber sensor 230 reflects a part of the light. The light receiver of the spectrum analyzer 232 receives the reflected light.

The spectrum analyzer 232 detects light intensity distribution in a predetermined wavelength band. The spectrum analyzer 232 detects the wavelength of the reflected light received by the light receiver. The wavelength detected by the spectrum analyzer 232 is converted from analog to digital by an A/D converter (not illustrated), and output to the controller 234.

The controller 234 manages and controls the whole diagnosis device 210 by using a semiconductor integrated circuit including a central processing unit (CPU), ROM having a program or the like stored therein, RAM that functions as a work area, and the like. In addition, the controller 234 also functions as a vibration controller 240, a collection processor 242, a diagnosis executor 244, and an outputter 246.

The vibration controller 240 applies voltage to the vibrator 228 and causes the vibrator 228 to vibrate the target TG.

The collection processor 242 measures each of the targets TG by using the optical fiber sensors 230. As described above, the collection processor 242 causes the spectrum analyzer 232 to emit the broad spectrum light and detect the wavelength of reflected light. The collection processor 242 uses the wavelength of the reflected light to measure change in the target TG that is a cause of the disturbance added to the grating members 230b.

For instance, with regard to the optical fiber sensor 230, a physical quantity is set in advance. The physical quantity is a target of measurement such as distortion (stress) or temperature of the target TG. In other words, an optical fiber sensor 230 for measuring distortion, an optical fiber sensor 230 for measuring temperature, and the like are installed.

The collection processor 242 measures distortion of the target TG by using reflected light from the optical fiber sensor 230 for measuring distortion. In addition, the collection processor 242 measures temperature of the target TG by using reflected light from the optical fiber sensor 230 for measuring temperature.

In addition, the collection processor 242 may measure distortion of the target TG by using reflected light from the optical fiber sensor 230 for measuring distortion while the vibration controller 240 is controlling the vibrator 228 and the vibrator 228 is vibrating the target TG. If there is a deficient target TG between a piezoelectric element of the vibrator 228 and the optical fiber sensor 230, different distortion (vibration) is measured in comparison with a case where there is no deficient target. In such a way, it is possible to detect the deficient target TG.

As described above, the collection processor 242 performs a correction process for collecting measurement data of the targets TG from the optical fiber sensors 230.

The diagnosis executor 244 performs a health diagnosis process for diagnosing health of the targets TG of the aircraft 200 on the basis of the collected measurement data. The collection process and the health diagnosis process are performed at any timing while the aircraft 200 is flying.

In the health diagnosis process, the health of a structure is diagnosed by using the collected measurement data of the targets TG. For instance, the diagnosis executor 244 uses, as standard data, measurement data obtained when there is no distortion and no deficiency such as a timing immediately after the diagnosis device 210 is loaded onto the aircraft 200. The diagnosis executor 244 derives evaluation values by comparing new measurement data with the standard data (by using differences, ratios, or the like between the new measurement data and the standard data). For instance, the health is calculated as a low evaluation value when the deficient target TG is detected or when the distortion or the temperature shows an abnormal value, as described above.

As a result of the health diagnosis process, the diagnosis executor 244 determines whether inspection or maintenance of a part such as the target TG is necessary. Here, the part such the target TG includes any of the target TG itself and a part constituting a portion of the target TG.

For instance, when the evaluation value is less than a first threshold that is set in advance, the diagnosis executor 244 determines that a part such as the target TG has to be inspected or maintained as the non-routine maintenance. In the non-routine maintenance, a cause of sudden malfunction is investigated and the cause is handled. Therefore, in the case where it is determined that there is the part such as the target TG that has to go under the non-routine maintenance, the non-routine maintenance is performed at an airport where the aircraft 200 will arrive next.

In addition, when a preset maintenance recommendation condition is satisfied, the diagnosis executor 244 determines that a part has to be inspected or maintained as routine maintenance. Here, the maintenance recommendation condition is that the evaluation value is the first threshold or more and less than a second threshold, for instance. However, the maintenance recommendation condition may be optionally set such that it is possible to specify a part for which the non-routine maintenance is not necessary but inspection or maintenance is recommended.

The second threshold is set in advance, and is larger than the first threshold. Here, the routine maintenance is periodical maintenance that has been set in advance. Basically, in the routine maintenance, the maintenance item is decided in accordance with an upper limit of a maintenance interval that is set for each part such as the target TG. The inspection or maintenance of the part such as the target TG for which it is determined that the routine maintenance is necessary is added to maintenance items of next routine maintenance.

On the storage 220, a type table is registered. In the type table, parts such as the targets TG constituting the aircraft 200 are associated with type information indicating types of the respective parts. The diagnosis executor 244 refers to the type table in the storage 220 and specifies the type information of a part for which inspection or maintenance is necessary.

When it is determined that inspection or maintenance is necessary for a part as a result of diagnosis of health performed by the diagnosis executor 244, the outputter 246 controls the communication unit 226 and outputs recommendation information to an outside of the aircraft 200 through wireless communication. For instance, the outside of the aircraft 200 is the maintenance management server 310. The recommendation information includes one or both of routine maintenance information and non-routine maintenance information.

The routine maintenance information includes the type information of a part for which inspection or maintenance is necessary as the routine maintenance (the part whose evaluation value is the first threshold or more and less than the second threshold) in the maintenance items of the next routine maintenance of the aircraft 200. The routine maintenance information is for recommending including maintenance of that part.

The non-routine maintenance information includes the type information of a part for which inspection or maintenance is necessary as the non-routine maintenance (the part whose evaluation value is less than the first threshold). The non-routine maintenance information is for recommending performing the non-routine maintenance of the part whose evaluation value is less than the first threshold at an airport where the aircraft 200 will arrive next.

On the storage 220 of the diagnosis device 210, addresses of airports where the aircraft 200 will arrive later in the communication network 302 are registered via the operation unit 222. Therefore, it is possible for the outputter 246 to output recommendation information to the registered address.

In the case where the recommendation information includes the non-routine maintenance information, the outputter 246 outputs recommendation information to the maintenance management server 310 installed in an airport where the aircraft 200 will arrive next. Alternatively, in the case where the recommendation information includes the routine maintenance information, the outputter 246 outputs recommendation information to the maintenance management server 310 installed in an airport where next routine maintenance will be performed. Here, in the case where the airport where the next routine maintenance will be performed has not been decided yet (is not registered on the storage 220), the outputter 246 outputs the recommendation information to the maintenance management server 310 of the airport where the next routine maintenance will be performed as soon as the airport where the next routine maintenance will be performed is decided.

Here, the case were the addresses of the airport were the aircraft 200 will arrive next and the airport where next routine maintenance will be performed in the communication network 302 are registered via the operation unit 222, has been described above. However, it is also possible that an address table is registered on the storage 220 and the outputter 246 specifies an address on the basis of an input airport name and the address table. In the address table, names of airports are associated with addresses in the communication network 302. In addition, the outputter 246 may acquire the address and the name of the airport from a controller (not illustrated) of the aircraft 200.

Figure 4:
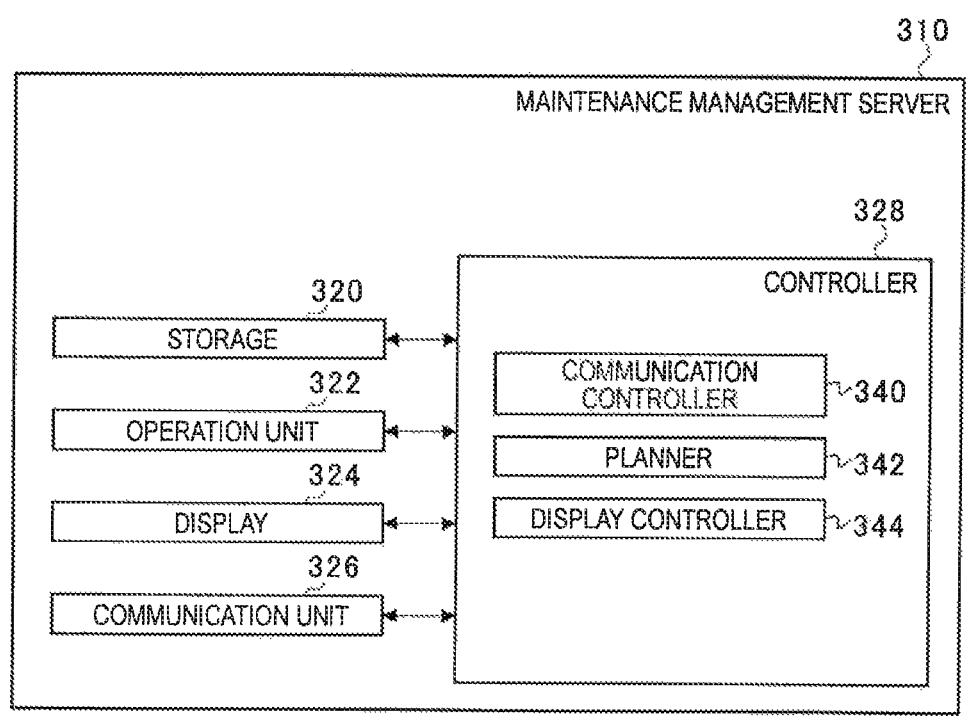
FIG. 4 is a block diagram illustrating a configuration of a maintenance management server.

FIG. 4 is a block diagram illustrating a configuration of the maintenance management server 310. As illustrated in FIG. 4, the maintenance management server 310 includes a storage 320, an operation unit 322, a display 324, a communication unit 326, and a controller 328.

The storage 320 is implemented as RAM, flash memory, an HDD, or the like. For instance, the operation unit 322 is implemented as a keyboard or a touchscreen that is superimposed on the display 324. The operation unit 322 receives operation input from a user. The display 324 is implemented as a liquid crystal display, an organic EL display, or the like. The communication unit 326 communicates with the diagnosis device 210 via the communication network 302, the base station 300, and the wireless communication device 202 of the aircraft 200.

The controller 328 manages and controls the whole maintenance management server 310 by using a semiconductor integrated circuit including a central processing unit (CPU), ROM having a program or the like stored therein, RAM that functions as a work area, and the like. In addition, the controller 328 also functions as a communication controller 340, a planner 342, and a display controller 344.

The communication controller 340 controls the communication unit 326 and acquires recommendation information output from the outputter 246 of the diagnosis device 210. The planner 342 generates or changes a draft plan of maintenance when the recommendation information is input from the communication unit 326.

On the storage 320, a draft plan of maintenance of an aircraft 200 is registered, the aircraft 200 being at an airport where the maintenance management server 310 is installed. In the case where recommendation information includes non-routine maintenance information, the planner 342 generates a draft plan of non-routine maintenance of the aircraft 200. For instance, in this draft plan, a specific mechanism for the inspection or the maintenance and a predicted value of time it takes to perform the inspection or maintenance are set with regard to a part for which it is determined that non-routine maintenance is necessary.

In addition, on the storage 320, a draft plan of routine maintenance of the aircraft 200 is registered in advance. As described above, with regard to the routine maintenance, maintenance items are decided in accordance with an upper limit of a maintenance interval that is set for each part such as the target TG. The frequency of routine maintenance, an airport where the routine maintenance will be performed, maintenance items of the routine maintenance are set such that each part such as the target TG does not exceed the upper limit of the maintenance interval.

In the case where recommendation information includes routine maintenance information, the planner 342 changes the draft plan of the routine maintenance of the aircraft 200 registered on the storage 320. Specifically, the planner 342 adds maintenance of a part indicated by the routine maintenance information to the maintenance items of the draft plan of the routine maintenance registered on the storage 320.

When a draft plan of non-routine maintenance is newly generated or a draft plan of routine maintenance is updated, the display controller 344 causes the display 324 to display the generated or updated draft plan. For instance, a worker resets allocation of mechanics or maintenance places in accordance with the displayed draft plan.

As described above, the aircraft management system 100 adds a maintenance item of routine maintenance in accordance with an evaluation value derived from the health diagnosis process. Therefore, it is possible to give a reaction such as part replacement before malfunction occurs, and suppress frequency of non-routine maintenance. In this case, a result of the health diagnosis process performed while the aircraft 200 has been flying is output to the maintenance management server 310 through wireless communication. Accordingly, it is possible to predict time it takes to perform routine maintenance before the aircraft 200 lands.

Figure 5:
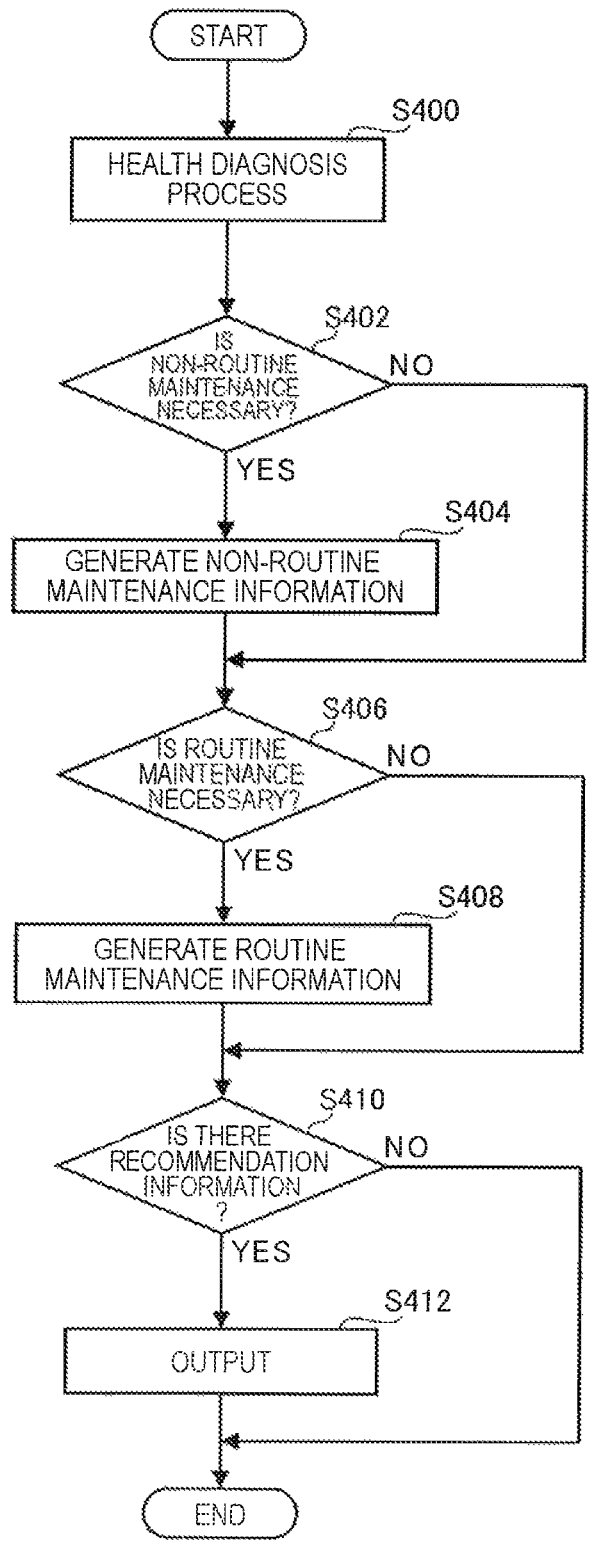
FIG. 5 is a flowchart illustrating procedure of a process of the diagnosis device.

FIG. 5 is a flowchart illustrating procedure of a process of the diagnosis device 210. The process illustrated in FIG. 5 is performed at any timing (for instance, is repeated on a predetermined cycle) while the aircraft 200 is flying.
(Step S400)
The diagnosis executor 244 performs the health diagnosis process for diagnosing health of a target TG of an aircraft 200 on the basis of measurement data collected by the collection processor 242.
(Step S402)
As a result of the health diagnosis process, the diagnosis executor 244 determines whether the non-routine maintenance is necessary for the part such as the target TG. The process proceeds to Step S404 when it is determined that the non-routine maintenance is necessary (YES in Step S402). The process proceeds to Step S406 when it is determined that the non-routine maintenance is not necessary (NO in Step S402).
(Step S404)
The diagnosis executor 244 generates non-routine maintenance information including type information of the part for which it is determined that the non-routine maintenance is necessary.
(Step S406)
As a result of the health diagnosis process, the diagnosis executor 244 determines whether routine maintenance is necessary for the part such as the target TG. The process proceeds to Step S408 when it is determined that the routine maintenance is necessary (YES in Step S406). The process proceeds to Step S410 when it is determined that the routine maintenance is not necessary (NO in Step S406).
(Step S408)
The diagnosis executor 244 generates routine maintenance information including type information of the part for which it is determined that the routine maintenance is necessary.
(Step S410)
The diagnosis executor 244 determines whether recommendation information is generated, in other words, whether one or both of the routine maintenance information and the non-routine maintenance information are generated. The process proceeds to Step S412 in the case where the recommendation information is generated (YES in Step S410). The process ends in the case where the recommendation information is not generated (NO in Step S410).
(Step S412)
The outputter 246 controls the communication unit 226, and outputs the recommendation information to an outside of the aircraft 200 through wireless communication. In the case where the recommendation information includes the non-routine maintenance information, the outputter 246 outputs the recommendation information to the maintenance management server 310 installed in an airport where the aircraft 200 will arrive next. In the case where the recommendation information includes the routine maintenance information, the outputter 246 outputs the recommendation information to the maintenance management server 310 installed in an airport where next routine maintenance will be performed.

FIG. 6 is a flowchart illustrating procedure of a process of the maintenance management server 310. The process illustrated in FIG. 6 is repeated on a predetermined cycle, for instance.
(Step S450)
The planner 342 determines whether the recommendation information is input from the communication unit 326. The process proceeds to Step S452 in the case where the recommendation information is input (YES in Step S450). The process ends in the case where the recommendation information is not input (NO in Step S450).
(Step S452)
The planner 342 determines whether the recommendation information includes the non-routine maintenance information. The process proceeds to step S454 in the case where the non-routine maintenance information is included (YES in Step S452). The process proceeds to Step S456 in the case where the non-routine maintenance information is not included (NO in Step S452).
(Step S454)
The planner 342 generates a draft plan of non-routine maintenance.
(Step S456)
The planner 342 determines whether the recommendation information includes the routine maintenance information. The process proceeds to Step S458 in the case where the routine maintenance information is included (YES in Step S456). The process proceeds to Step S460 in the case where the routine maintenance information is not included (NO in Step S456).

(Step S458)

The planner 342 updates the draft plan of the routine maintenance.

(Step S460)

When the draft plan of the non-routine maintenance is newly generated or the draft plan of the routine maintenance is updated, the display controller 344 causes the display 324 to display (announce) the generated or updated draft plan.

Although the embodiment of the disclosure has been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For instance, in the above-described embodiment, the vibrator 228 and the optical fiber sensors 230 have been used as instances. However, it is possible to use other sensors. The vibrator 228 is not an essential structural element. In addition, the fiber Bragg grating optical fiber sensors 230 have been used as instances. However, it is possible to use optical fiber sensors 230 of another type. It is possible to measure a physical quantity or a chemical quantity of a target TG by using not change in wavelength of light but change in other characteristics (intensity, phase, frequency, or polarized wave).

In addition, in the above-described embodiment, the case where the recommendation information is for recommending including maintenance of a part that satisfies the maintenance recommendation condition in the maintenance items of next routine maintenance of the aircraft 200, has been described. In this case, it is possible to rapidly perform the maintenance of the part that satisfies the maintenance recommendation condition. However, the maintenance timing is not limited to the next routine maintenance. It is only necessary to include the maintenance of the part that satisfies the maintenance recommendation condition in maintenance items of any future routine maintenance. Simply, it is only necessary that the recommendation information be information capable of specifying a part estimated to need routine maintenance.

In addition, in the above-described embodiment, the case where the maintenance management server 310 is installed has been described. In this case, a draft plan of routine maintenance is certainly updated. However, the maintenance management server 310 is not an essential structural element. It is also possible to update the draft plan of routine maintenance in accordance with operation input by a worker.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

According to the embodiment of the disclosure, it is possible to suppress frequency of the non-routine maintenance and early predict time it takes to perform the routine maintenance.

The invention claimed is:

1. An aircraft management system comprising:
a sensor configured to be attached to an aircraft;
a diagnosis device that includes a controller having a diagnosis executor that is configured to diagnose health of a target part of the aircraft, while the aircraft is flying, inclusive of a diagnosis on a basis of output from the sensor, the controller being configured to output a dedicated target part test signal to a generator device that generates a characteristic change in the target part for testing purposes, which change in characteristic of the target part is sensed by the sensor; and
an outputter configured to output a predetermined recommendation information to an outside of the aircraft through wireless communication, in a case where the target part satisfies a preset maintenance recommendation condition as a result of the diagnosis of the health, and wherein the predetermined recommendation information includes one or both of routine maintenance information and non-routine maintenance information, and
wherein the diagnosis executor is configured to diagnose a first health condition indicative of a need for routine maintenance and a second health condition indicative of a need for non-routine maintenance, and wherein the outputter is configured to switch between the output of recommendation information as to the need for non-routine maintenance and the output of recommendation information as to the need for routine maintenance according to the result of the health diagnosis by the diagnosis executor, and
the aircraft management system further comprises a maintenance management server including a storage, an operation unit, a communication unit that is configured for communication with the outputter and a display, the storage includes a draft plan of routine maintenance of the aircraft, wherein maintenance items of the routine maintenance are decided in accordance with an upper limit of a maintenance interval that is set for each part of the aircraft stored in the aircraft management system.

2. The aircraft management system according to claim 1, wherein, when the diagnosis executor diagnoses the second health condition, the recommendation information as to the need for non-routine maintenance includes recommending maintenance of the target part in a maintenance item established by the management server at an airport where the aircraft will land next.

3. The aircraft management system according to claim 1, wherein
the maintenance management server, in generating the draft plan of the routine maintenance, when the recommendation information as to the need for routine maintenance is input, includes storing a maintenance item for routine maintenance performance for later forwarding to a next airport for the routine maintenance performance once registered in the management server.

4. The aircraft management system according to claim 1 wherein the generator device is a target part vibration generator device.

5. The aircraft management system according to claim 4 wherein the generator device is a piezo electric vibration generator device that is attached to the target part.

6. The aircraft management system according to claim 1 wherein the controller is configured to control output of the dedicated target part test signal and to provide pulse signals to the generator device so as to generate vibrations in the target part to enable the change in characteristic in the target part which is sensed by the sensor.

7. The aircraft management system according to claim 1 wherein the dedicated target part test signal to the generator device generates the characteristic change in the target part solely for testing purposes.

8. The aircraft management system according to claim 1 further comprising a spectrum analyzer, and wherein the sensor comprises an optical fiber, and the spectrum analyzer is in communication with both the controller and the optical fiber.

9. The aircraft management system according to claim 1 wherein the sensor includes an adhesive for attachment to the aircraft.

10. The aircraft management system according to claim 1, wherein the maintenance management server is configured to include, in addition to the draft plan of the routine maintenance when routine maintenance recommendation information is received, a draft plan of non-routine maintenance when non-routine maintenance recommendation information is received; and wherein the maintenance management server is further configured to send the draft plan of the non-routine maintenance to an airport of next arrival for the aircraft, and send the draft plan of the routine maintenance to an airport where next routine maintenance is set to be performed.

11. The aircraft management system according to claim 1 wherein the diagnosis device sets a first target wear level threshold and a second target wear level threshold, and wherein, upon a wear level of the target part exceeding the first target wear level threshold and falling below the second target wear level threshold, the first health condition is set by the diagnosis executor and a routine maintenance plan is developed by the maintenance management server that takes into consideration the second target wear level threshold as the upper limit of the maintenance interval.

12. The aircraft management system according to claim 11 wherein the diagnosis device, upon detection of non-routine maintenance requirement prior to the wear level of the target part reaching the first target wear level threshold, sets the second health condition indicative of the need for non-routine maintenance.

13. The aircraft management system of claim 1 wherein the target part is a sheet of the aircraft.

14. An aircraft management system comprising:
a sensor configured to be loaded onto an aircraft and attached to a target part of the aircraft; and
circuitry configured to
diagnose health of the target part of the aircraft, while the aircraft is flying, inclusive of a diagnosis on a basis of output from the sensor, and
output a dedicated test initiation signal to a generator device that generates a change in characteristic in the target part for test purposes, which change in characteristic is sensed by the sensor;
diagnose a first health condition indicative of a need for routine maintenance and a second health condition indicative of a need for non-routine maintenance; and
output a predetermined recommendation information to an outside of the aircraft through wireless communication, in a case where the target part satisfies a preset maintenance recommendation condition as a result of the diagnosis of the health, wherein the preset recommendation information includes one or both of routine maintenance information and non-routine maintenance information, and;
the aircraft management system further comprises a maintenance management server including a storage, an operation unit, a communication unit that is configured for communication with the circuitry for outputting the predetermined recommendation information and a display, the storage includes a draft plan of routine maintenance of the aircraft, wherein maintenance items of the routine maintenance are decided in accordance with an upper limit of a maintenance interval that is set for each part of the aircraft stored in the aircraft management system.

15. An aircraft management system comprising:
a sensor configured to be loaded onto an aircraft;
a diagnosis executor configured to diagnose health of a part of the aircraft inclusive of a diagnosis on a basis of an aircraft part characteristic change determination output from the sensor while the aircraft is flying;
a controller configured to initiate a test generation signal that results in the aircraft part characteristic change determination output from the sensor; and
an output device configured to output a predetermined recommendation information to an outside of the aircraft through wireless communication, in a case where the aircraft part satisfies a preset maintenance recommendation condition as a result of the diagnosis of the health, wherein the predetermined recommendation information includes one or both of routine maintenance information and non-routine maintenance information, and
wherein the diagnosis executor is configured to diagnose a first health condition indicative of a need for routine maintenance and a second health condition indicative of a need for non-routine maintenance, and wherein the aircraft management system further comprises a maintenance management server including a storage, an operation unit, a communication unit that is configured for communication with the output device and a display, the storage includes a draft plan of routine maintenance of the aircraft, wherein maintenance items of the routine maintenance are decided in accordance with an upper limit of a maintenance interval that is set for each part of the aircraft stored in the aircraft management system.

16. The aircraft management system of claim 15 wherein the sensor is an optical fiber sensor and the aircraft part characteristic change is a distortion stress change in the aircraft part.

17. The aircraft management system of claim 15 wherein the sensor is an optical fiber sensor that comprises a fiber Bragg grating.

18. The aircraft management system of claim 15 further comprising a vibration device attached to the aircraft part and wherein a target part distortion stress is generated in the aircraft part by the vibration device and the test generation signal causes a development of a vibration in the vibration device.

19. The aircraft management system of claim 15 further comprising a spectrum analyzer and wherein the sensor comprises an optical fiber that is in communication with the spectrum analyzer.

* * * * *